(12) United States Patent
Scherzer et al.

(10) Patent No.: US 6,956,537 B2
(45) Date of Patent: Oct. 18, 2005

(54) CO-LOCATED ANTENNA ARRAY FOR PASSIVE BEAM FORMING

(75) Inventors: Shimon B. Scherzer, Sunnyvale, CA (US); Gary A. Martek, Edgewood, WA (US); Scot D. Gordon, Bothell, WA (US)

(73) Assignee: Kathrein-Werke KG, Rosenheim (DE)

( * ) Notice: Subject to any disclaimer, the term of this patent is extended or adjusted under 35 U.S.C. 154(b) by 283 days.

(21) Appl. No.: 10/242,276

(22) Filed: Sep. 11, 2002

(65) Prior Publication Data

US 2003/0052828 A1 Mar. 20, 2003

Related U.S. Application Data

(60) Provisional application No. 60/322,573, filed on Sep. 12, 2001, provisional application No. 60/322,542, filed on Sep. 12, 2001, provisional application No. 60/322,494, filed on Sep. 12, 2001, and provisional application No. 60/342,571, filed on Dec. 20, 2001.

(51) Int. Cl.[7] .............................................. H01Q 21/00
(52) U.S. Cl. ..................... 343/853; 343/844; 343/754
(58) Field of Search ....................... 343/700 MS, 754, 343/795, 844, 850, 853, 893, 815, 817, 818, 890

(56) References Cited

U.S. PATENT DOCUMENTS

| 5,414,437 A | * | 5/1995 | Mahnad ........................ 343/770 |
| 5,872,547 A | * | 2/1999 | Martek ......................... 343/815 |
| 5,929,823 A | * | 7/1999 | Martek et al. ............... 343/817 |
| 5,940,048 A | | 8/1999 | Martek ......................... 343/893 |
| 6,070,090 A | | 5/2000 | Feuerstein ................... 455/561 |
| 6,094,166 A | | 7/2000 | Martek et al. ............... 342/374 |
| 6,172,654 B1 | | 1/2001 | Martek ......................... 343/893 |
| 6,188,373 B1 | | 2/2001 | Martek ......................... 343/893 |
| 6,198,434 B1 | | 3/2001 | Martek et al. ............... 342/373 |
| 6,211,841 B1 | * | 4/2001 | Smith et al. ................. 343/813 |

OTHER PUBLICATIONS

International Search Report issued for PCT/US02/28944, dated Jun. 16, 2004.
U.S. Appl. No. 09/878,599, filed Jun. 11, 2001, Scherzer et al.
U.S. Appl. No. 60/322,573, filed Sep. 12, 2001, Scherzer et al.
U.S. Appl. No. 60/322,542, filed Sep. 12, 2001, Gordon et al.
U.S. Appl. No. 60/322,494, filed Sep. 12, 2001, Martek et al.
U.S. Appl. No. 09/999,261, filed Nov. 15, 2001, Scherzer et al.
U.S. Appl. No. 60/342,571, filed Dec. 20, 2001, Gordon et al.
U.S. Appl. No. 10/242,311, filed Sep. 11, 2002, Gordon et al.

* cited by examiner

*Primary Examiner*—Hoang V. Nguyen
(74) *Attorney, Agent, or Firm*—Fulbright & Jaworski LLP

(57) ABSTRACT

Disclosed is an integrated antenna array comprising a plurality of interleaved sub-arrays separately controllable and responding to either the same or separate frequency bands. Both arrays operate with substantially the same phase center and substantially within the same effective aperture. The first sub-array of array comprises of spaced linear radiating elements such as dipoles, log-periodic, Yagi, slotted-waveguide, patch, or array consisting of the same or different elements as used in the first sub-array, either on the same or an entirely different frequency band. Independent beam shaping systems are shown for independent operation of the two arrays.

44 Claims, 10 Drawing Sheets

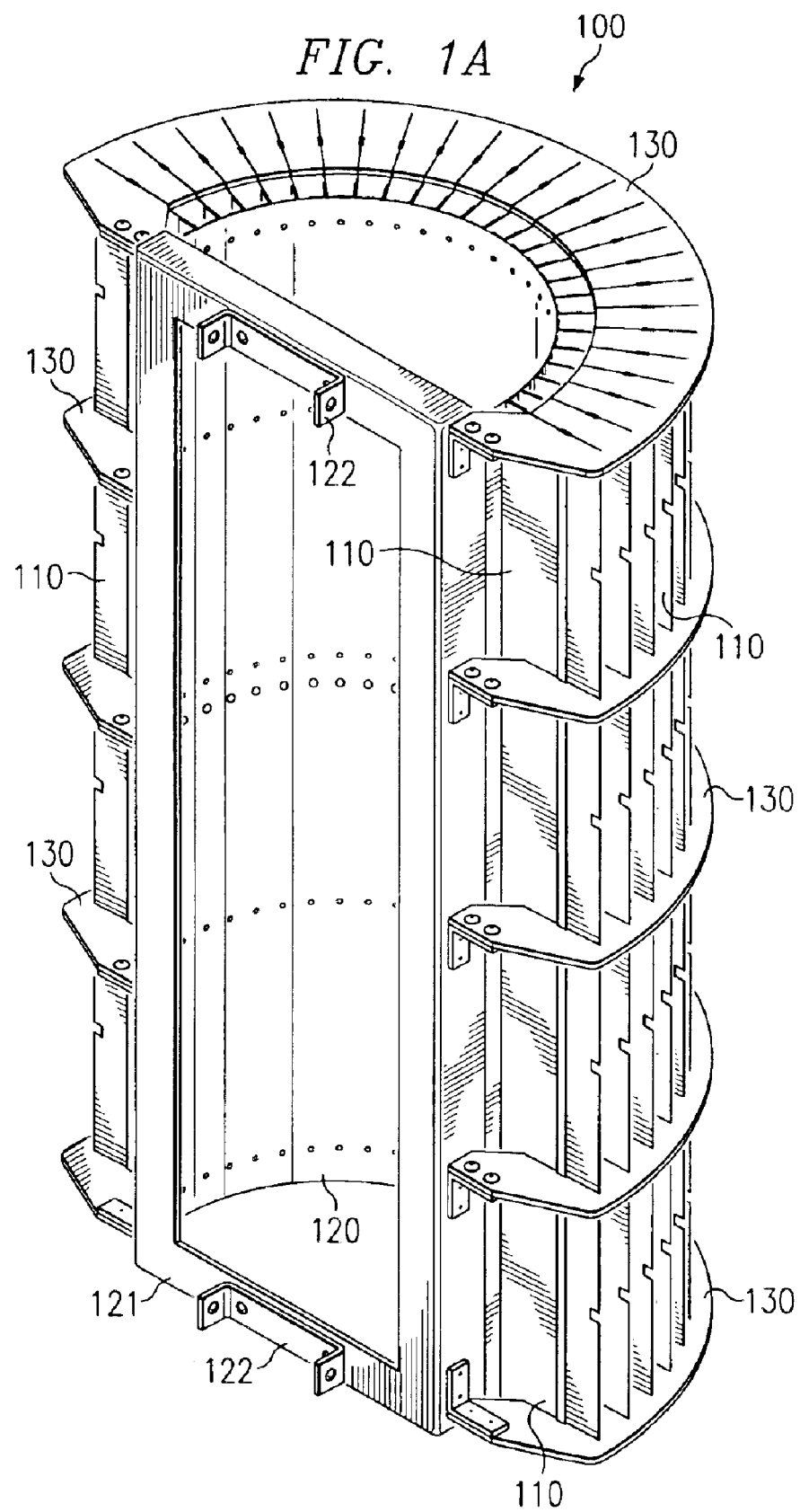

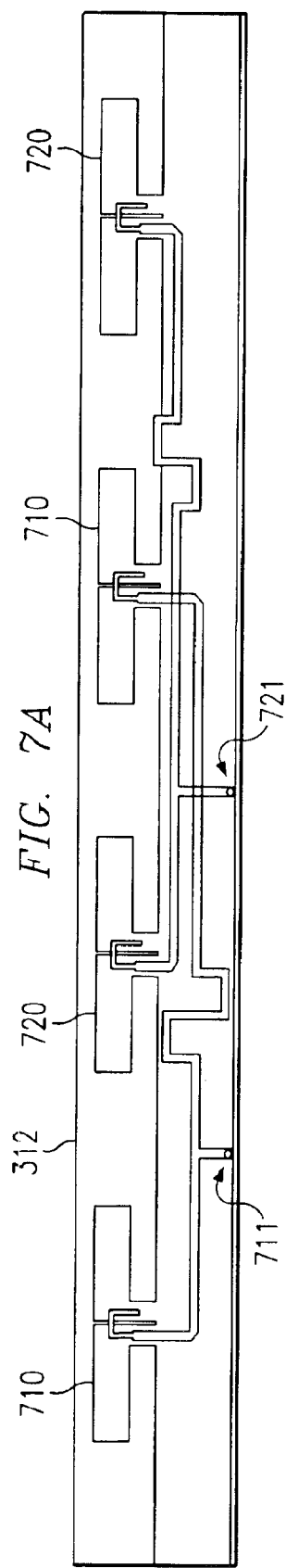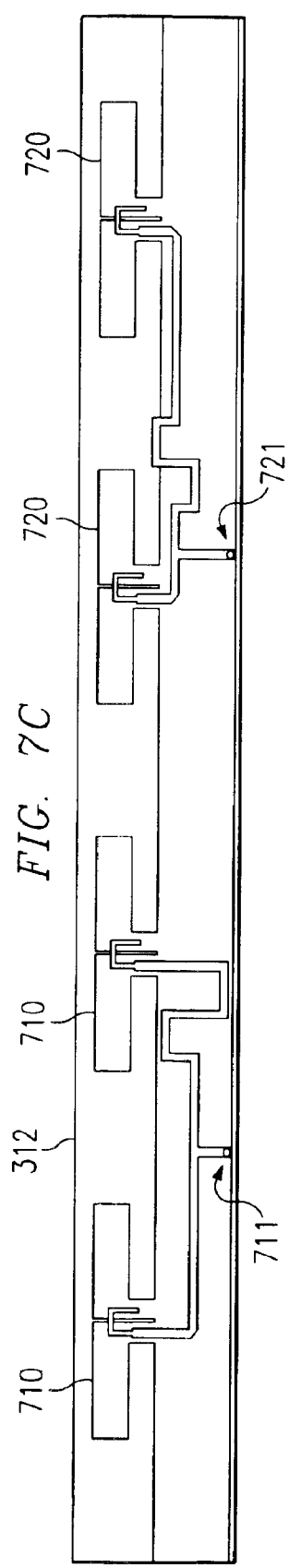

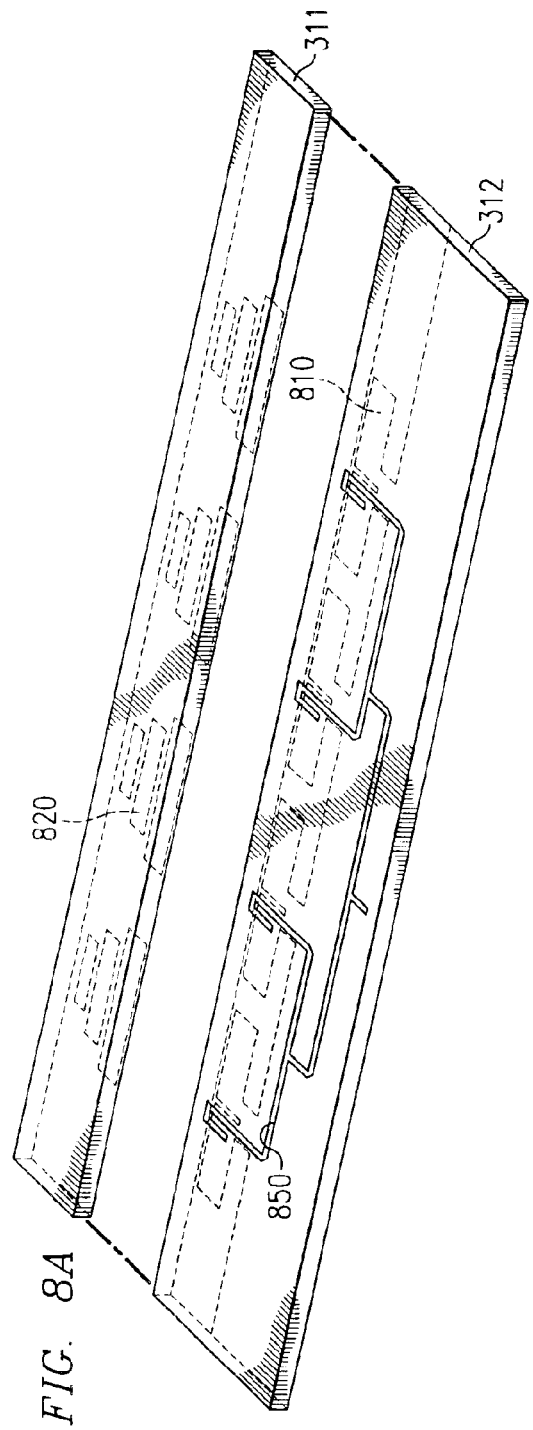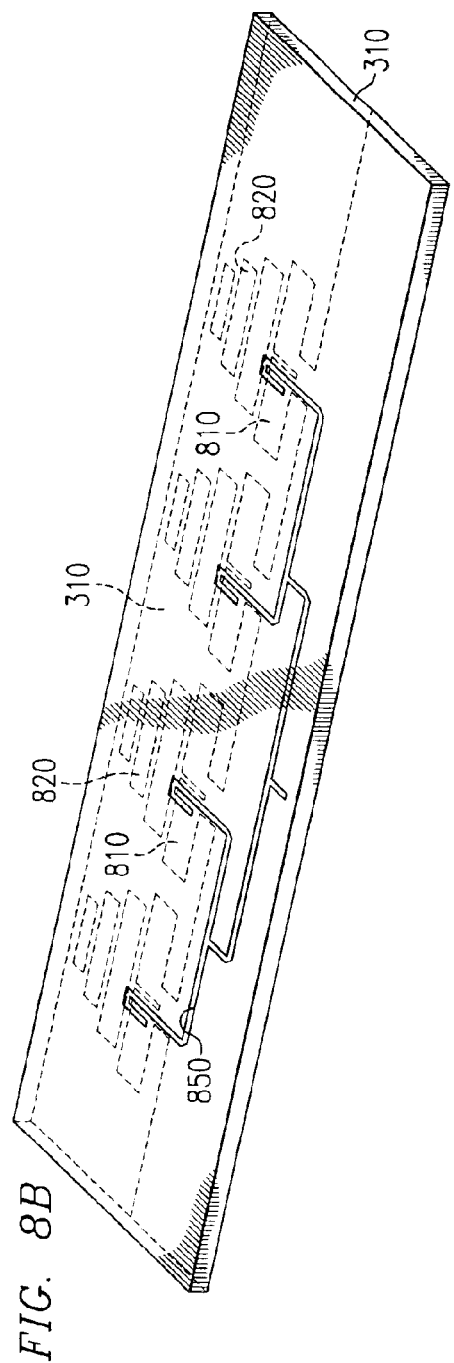

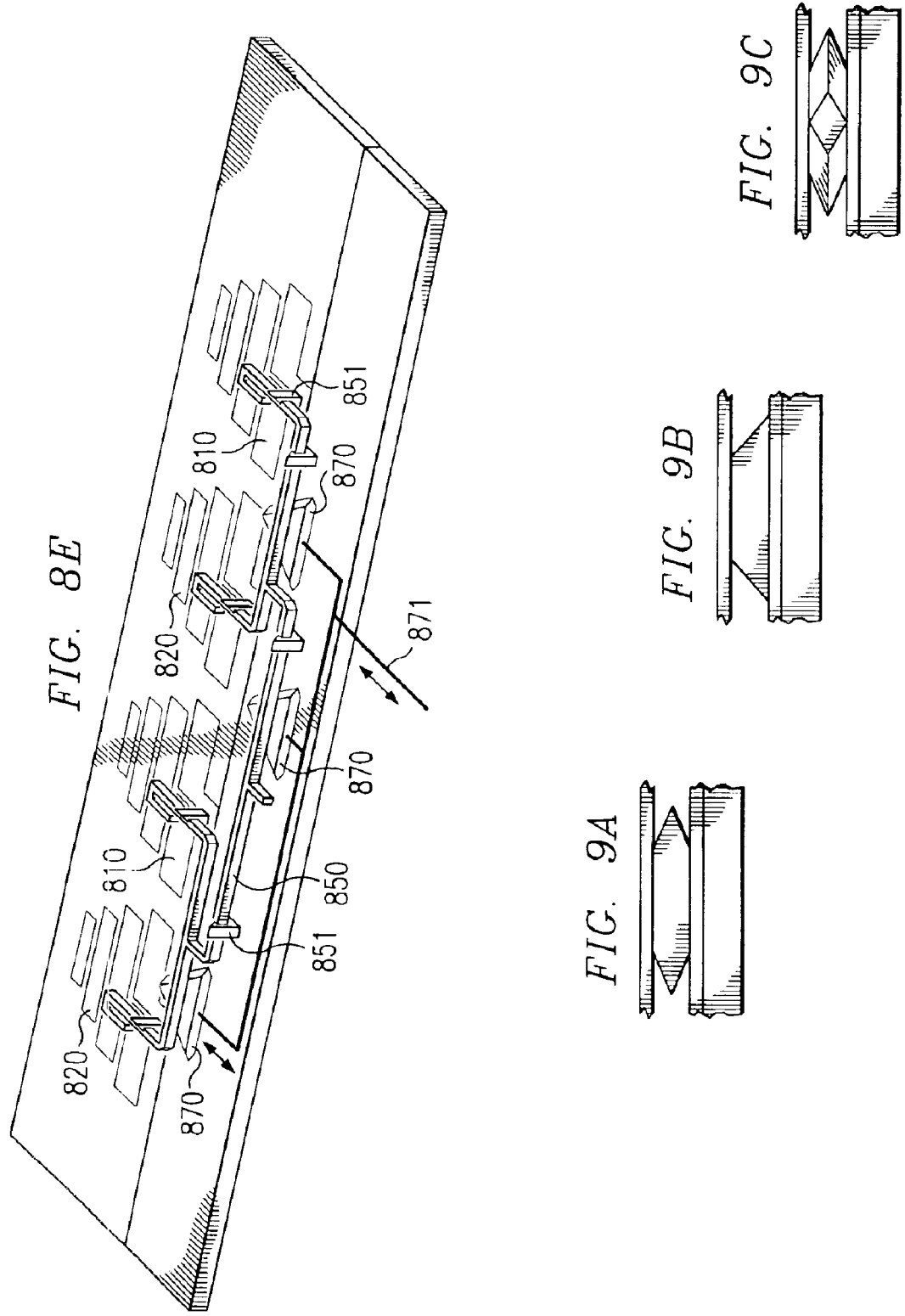

CO-LOCATED ANTENNA ARRAY FOR PASSIVE BEAM FORMING

REFERENCE TO RELATED APPLICATIONS

The present application is related to, and hereby claims priority to, co-pending and commonly assigned U.S. provisional patent applications Ser. No. 60/322,573 entitled "Co-Located Antenna Array for Passive Beam Forming," filed Sep. 12, 2001, Ser. No. 60/322,542 entitled "Automated Process for Generating Arbitrary Passive Beam Forming Networks," filed Sep. 12, 2001, Ser. No. 60/322,494 entitled "Inexpensive Fabrication Technique for Making Antenna Element Cards," filed Sep. 12, 2001, and Ser. No. 60/342,571 entitled "Co-Located Antenna Array for Passive Beam Forming," filed Dec. 20, 2001, the disclosures of which are incorporated herein by reference in their entirety. The present application is also related to commonly assigned U.S. patent applications Ser. No. 10/242,311 entitled "Generating Arbitrary Passive Beam Forming Networks," concurrently filed herewith, Ser. No. 09/878,599 entitled "Passive Shapable Sectorization for Cellular Networks," filed Jun. 11, 2001, and Ser. No. 09/999,261 entitled "Passive Shapable Sectorization Antenna Gain Determination," filed Nov. 15, 2001, the disclosures of which are incorporated herein by reference in their entirety.

FIELD OF THE INVENTION

The invention relates generally to wireless communication and, more particularly, to co-located antenna array configurations.

BACKGROUND OF THE INVENTION

Often it is desirable to provide two antenna arrays at a wireless communication site. For example, in typical cellular systems there is a need for two transmitter arrays for a single carrier. In order to provide a traffic channel as well as a control channel in a particular service area, cellular providers will typically deploy two standard sector arrays, generally physically spaced apart by an appreciable distance. However, the phase centers of such arrays are offset with respect to one another, which can result in undesirable communication attributes. For example, a pilot signal transmitted from a first such array (having a first phase center) may not experience fading with respect to a particular subscriber unit whereas a corresponding traffic channel transmitted from a second such array (having a second phase center) may experience significant fading.

Moreover, the aforementioned arrays are relatively simple configurations for providing illumination of an associated area, such as a 120° sector. Accordingly, such arrays do not accommodate complex beam forming as is available from a more complex array, such as a phased array configuration. Providing complex beam forming, such as using a phased array configuration, presents implementation challenges. For example, array configurations adapted to facilitate beam forming often have a larger aperture associated therewith and, accordingly, present issues with respect to tower space and wind loading. These issues are compounded when accommodating a two array configuration. For example, two beam forming arrays would occupy a large space on the tower and might incur wind loading conditions that are not supportable by the tower. Moreover, there are additional issues with respect to aesthetics, zoning, etcetera, that make deploying beam forming antenna arrays, and particularly two beam forming antenna arrays, on a tower impractical.

An additional challenge with respect to providing complex beam forming is presented with respect to implementing a control system to facilitate proper beam forming. For example, a dynamic control system may be implemented to monitor attributes with respect to cell morphology and/or topology in order to adjust beam forming parameters. Such adjustment of beam forming parameters may be utilized to optimize antenna beam configurations for communications within a desired area, such as a sector of the cell, and/or to minimize interference with respect to other areas, such as another sector of this or another cell. Systems for providing dynamic control of antenna beams are shown and described in U.S. Pat. No. 6,108,565 entitled "Practical Space-Time Radio Method for CDMA Communication Capacity Enhancement" and U.S. Pat. No. 5,889,494 entitled "Antenna Deployment Sector Cell Shaping System and Method," the disclosures of which are hereby incorporated herein by reference.

A need exists in the art for systems and methods which provide antenna arrays adapted to facilitate desired beam forming while providing a configuration supporting multiple discrete antenna beams. A need further exists for such multiple discrete antenna beams to be provided with a common phase center. A still further need exists such systems and methods to be adapted to provide a relatively simple and/or inexpensive solution, such as by avoiding the use of dynamic antenna beam control systems.

BRIEF SUMMARY OF THE INVENTION

The present invention is directed to systems and methods in which multiple antenna sub-arrays are provided in a common antenna array aperture. Antenna arrays of the present invention may be utilized to allow a communication provider to have multiple transmit and/or receive paths with respect to a communication area, such as to illuminate a communication area with a discrete pilot channel and corresponding traffic channel. Additionally or alternatively, such antenna arrays may be utilized to allow multiple communication providers to share a common communication structure, such as a tower and/or base transceiver station (BTS).

According to a preferred embodiment, antenna elements of a plurality of sub-arrays are provided in an antenna array in an interleaved configuration. That is, antenna elements forming a sub-array used with respect to a first antenna beam are interleaved in the antenna array with antenna elements forming a sub-array used with respect to a second antenna beam. Interleaving of antenna elements according to an embodiment of the present invention utilizes columns of antenna elements, wherein antenna element columns of a first sub-array are interleaved with antenna element columns of a second sub-array. Additionally or alternatively, interleaving of antenna elements according to the present invention may utilize columns of antenna elements, wherein antenna elements of a first sub-array are interleaved with antenna elements of another sub-array within a same antenna element column. Accordingly, the antenna aperture, although providing forming of multiple discrete antenna beams, may be minimized according to the present invention. Moreover, such antenna arrays may reside in a single enclosure, such as a common radome.

According to a preferred embodiment, ones of the multiple discrete antenna beams provided by the antenna array may be utilized by a plurality of communication providers operating in the same or different communication bands, such as an advanced mobile phone system (AMPS) band and a personal communication services (PCS) band. It may be desired to utilize appreciably different beam forming characteristics with respect to a first sub-array associated with a first communication provider and a second sub-array associated with a second communication provider. Moreover, the beam forming pattern that is used for each individual communication provider may need to change over time.

Accordingly, embodiments of the present invention provide a structure that allows for the beam forming network associated with one or more antenna element sub-array to be reconfigured independently of the beam forming network associated with another one or more antenna element sub-array. Preferred embodiments of the present invention utilize beam forming personality modules associated with one or more sub-arrays to facilitate independent configuration/reconfiguration of beam forming networks of the various sub-arrays. Such personality modules are preferably passive or active beam forming networks provided in removable modules for interfacing with antenna elements of a particular sub-array.

In implementing antenna arrays of the present invention, wherein sub-arrays utilized for different communication services and/or communication providers reside in the same antenna array, it is desirable to adapt the antenna array to mitigate/prevent interference between the sub-arrays, such as by providing sufficient isolation between the antenna elements of the various sub-arrays. Accordingly, preferred embodiments of the present invention utilize high directivity antenna elements which, when they are disposed next to each other in an array, are less likely to interfere with their neighbors.

Preferred embodiments of the invention provide a cylindrical array configuration for disposing multiple sub-arrays in an antenna array. The preferred embodiment cylindrical array facilitates the use of high directivity array elements because the cylindrical configuration points the elements in the directions of communication coverage, thereby avoiding many of the scanning problems associated with use of high directivity array elements in an antenna array. Moreover, cylindrical array configurations accommodate multiple passive or active beam forming networks of preferred embodiments of the present invention. For example, in one embodiment of the invention, alternate array elements, which are spaced around the circumference of a cylindrical antenna configuration, are coupled to different passive or active beaming networks. Each one of these networks is controlled, for example, by a personality card which sets the personality, i.e., the coverage area, for that element set.

Embodiments of the present invention utilize modular antenna element configurations. For example, embodiments of the invention may utilize an integrated set of antenna elements comprised of inexpensive printed circuit board material and airline-type transmission lines feeding the individual elements. Such printed circuit board embodiments may provide modular cards forming antenna element columns of the antenna array. Such modular cards may be deployed in any desired configuration, such as the aforementioned cylindrical configuration.

Antenna element cards of a preferred embodiment of the present invention provide a plurality of high directivity antenna elements upon each card. The antenna elements of a card may be coupled to a same feed line, such as to provide an antenna element column for a particular feed network, or may be coupled to a plurality of feed lines, such as to provide a column of interleaved antenna elements for a plurality of feed networks. Where antenna elements of a card are for a plurality of feed networks, the antenna elements are preferably adapted to provide isolation with respect to signals of the plurality of feed networks. For example, the length of the individual antenna elements of such cards may be selected to be electrically shorter than ½ wavelength (λ) traditionally used in antenna arrays.

Embodiments of the present invention are preferably adapted to provide adjustable down-tilt with respect to antenna beams associated with the sub-arrays. Preferably, such down-tilt adjustment may be provided independently with respect to the antenna beams associated with the various sub-arrays. For example, a preferred embodiment utilizes dielectric material which may be movably placed in a airline-type feed line of the antenna elements of a sub-array. The placement of such dielectric material may be adjusted, such as through the use of a gang arrangement, to affect a phase differential between antenna elements of a sub-array and, thereby, provide electrical down-tilt adjustment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 1A and 1B show an antenna array adapted according to an embodiment of the present invention;

FIGS. 7A–7C show detail with respect to embodiments of an antenna element card of the antenna element assembly of FIGS. 3A and 3B;

FIGS. 8A–8E show alternative embodiments of an antenna element assembly of the antenna array of FIGS. 1A and 1B; and FIGS. 9A–9C show detail with respect to embodiments of dielectric phase shifters useful with the antenna element assemblies of FIGS. 8D and 8E.

DETAILED DESCRIPTION OF THE INVENTION

Figure 1B:
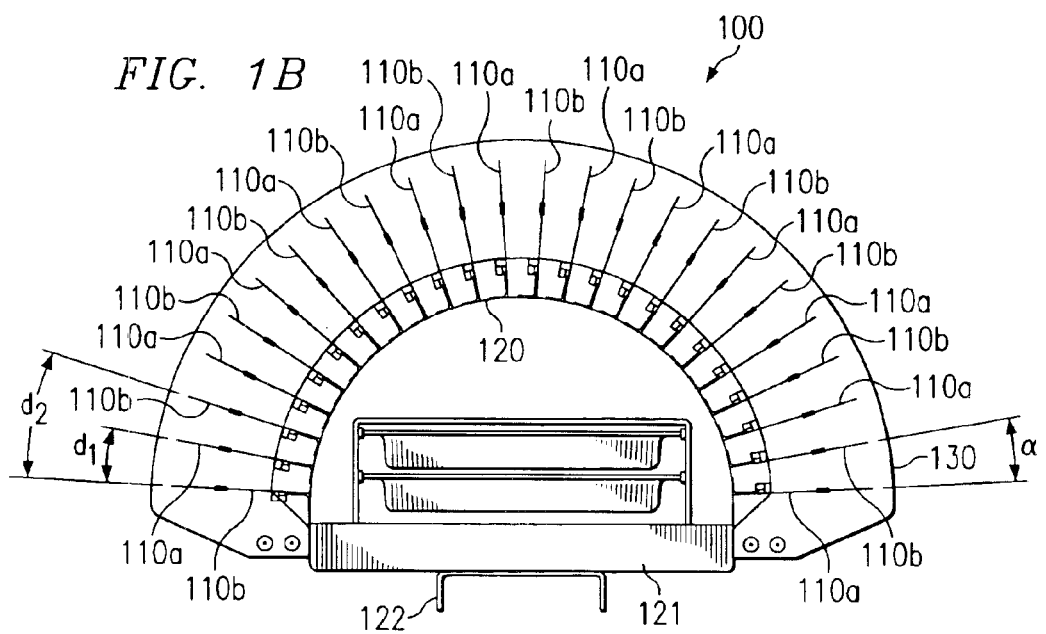

Directing attention to FIGS. 1A and 1B, a preferred embodiment antenna array configuration is shown as antenna array 100. Antenna array 100 of the illustrated embodiment includes a plurality of antenna element assemblies 110, each including one or more antenna elements. According to a preferred embodiment, antenna element assemblies 110 each comprise a plurality of individual antenna elements, such as dipole, log-periodic, Yagi, slotted-waveguide, patch, helical, horn, and/or like antenna elements, forming an antenna element column.

Figure 2:
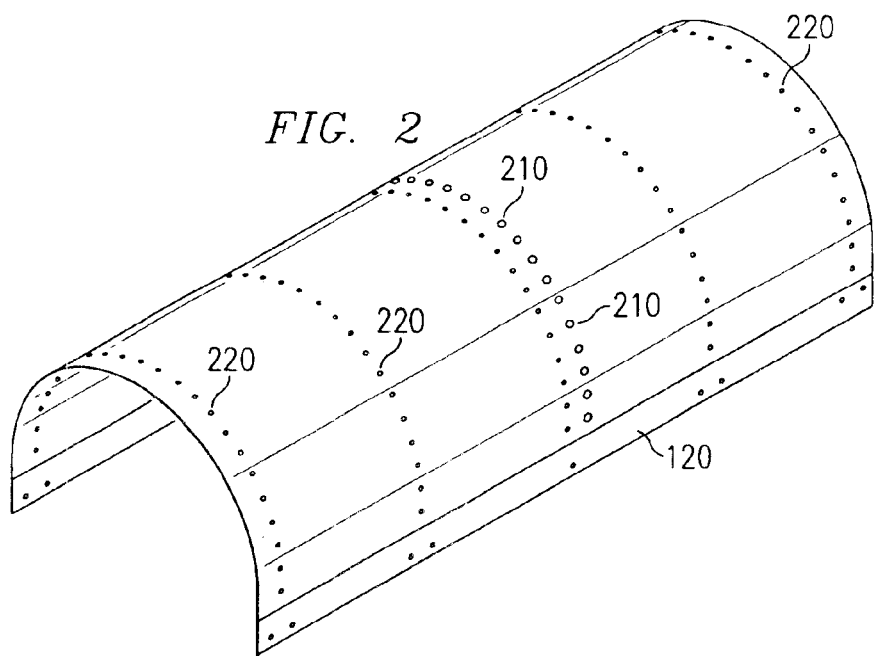
FIG. 2 shows detail with respect to an embodiment of a shell component of the antenna array of FIGS. 1A and 1B.

Antenna element assemblies 110 are preferably disposed in a predetermined orientation to define an antenna array. Accordingly, antenna elements of the illustrated embodiment are coupled to shell 120, providing a cylindrical configuration in the illustrated embodiment. Shell 120 preferably provides mechanical support for antenna element assemblies 110. Accordingly, shell 120 includes frame 121 and mounting bracket 122 to provide rigidity and/or to facilitate deploying antenna array 100. Moreover, shell 120 of the preferred embodiment further includes antenna element assembly mounting points 220 as shown in FIG. 2. Of course, additional or alternative techniques for providing mechanical support for antenna element assemblies of the present invention may be provided, if desired.

Shell 120 preferably provides a ground plane surface with respect to antenna elements of antenna element assemblies 110. Accordingly, shell 120 of the illustrated embodiment comprises feed network coupling vias 210 as shown in FIG. 2. For example, a BALUN from a feed network disposed behind shell 120 may extend through a particular feed network coupling via 210 to be placed in communication with antenna elements of a particular antenna element assembly disposed upon shell 120.

Preferably, the antenna elements of antenna element assemblies 110 are highly directive, e.g., providing spatial domain radiation dispersion in the azimuth of less than 100°, thereby providing appreciable signal isolation between adjacent ones of the antenna element assemblies. Such high directivity antenna elements used in conjunction with the aforementioned cylindrical configuration facilitates beam forming and steering according to the preferred embodiment. Although planar arrays may be utilized according to embodiments of the present invention, standard planer configurations using the aforementioned high directivity antenna elements do not allow the desired level of beam steering.

Preferably, antenna element assemblies 110 of antenna array 100 comprise a plurality of sub-arrays for independently providing beam forming. For example, antenna element assemblies of different sub-arrays may be interleaved such that alternate ones of the antenna element assemblies are associated with a first sub-array and other alternate ones of the antenna element assemblies are associated with a second sub-array. With reference to FIG. 1B, antenna element assemblies 110a may comprise a first sub-array of antenna array 100 whereas antenna element assemblies 110b may comprise a second sub-array of antenna array 100. Additionally or alternatively, antenna elements of sub-arrays may be interleaved upon a same antenna element assembly, if desired.

The aforementioned interleaved sub-array configurations provides advantages in several regards. Such interleaved configurations results in a single antenna array aperture providing a plurality of independent antenna beams. Moreover, such interleaved configurations provides for phase centers with respect to each such antenna beam being oriented in substantially a same position.

Figure 3A:
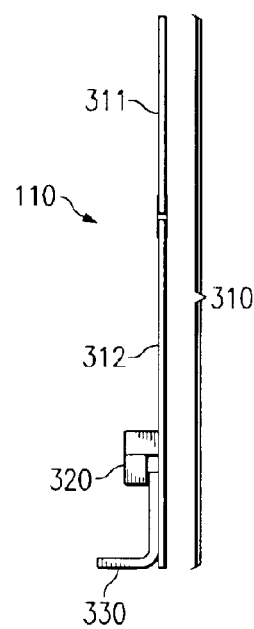
FIGS. 3A and 3B show detail with respect to an embodiment of an antenna element assembly of the antenna array of FIGS. 1A and 1B.
Figure 3B:
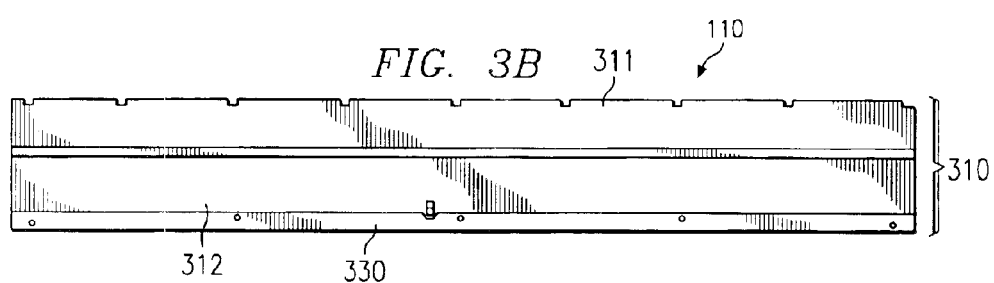

Antenna element assemblies 110 of a preferred embodiment preferably comprise one or more "card" structures having a plurality of antenna elements disposed thereon and adapted for coupling to shell 120 and/or feed networks associated therewith. For example, relatively inexpensive printed circuit board material and airline-type transmission lines may be utilized to provide a column of Yagi antenna elements comprising antenna element assemblies 110 of a preferred embodiment. Directing attention to FIGS. 3A and 3B, a preferred embodiment antenna element assembly 110 is shown to include card assembly 310 comprising director card 311 and antenna element card 312, connector 320, and mounting bracket 330. Antenna element card 312 preferably includes individual antenna elements and their associated feed lines (not shown in FIGS. 3A and 3B) thereon and director card 311 preferably includes passive directive elements (also not shown in FIGS. 3A and 3B) thereon, as will be discussed in further detail hereinbelow. Connector 320 preferably provides an interface for electrically coupling feed lines and/or antenna elements of antenna element assembly 110 to a signal feed network (such as through via 210 of FIG. 2). Mounting bracket 330 preferably provides a mechanical support assembly for securely attaching antenna element assembly 110 to a support structure, such as shell 120. Of course, there is no limitation of an antenna element assembly utilized according to the present invention being configured as shown in FIGS. 3A and 3B. For example, a single card structure, rather than cards 311 and 312 of the illustrated embodiment, may be utilized, if desired.

Referring again to FIGS. 1A and 1B, antenna array 100 of the illustrated embodiment provides antenna element alignment and/or support using halos 130. Specifically, halos 130 of the illustrated embodiment provide grooves or slots to accept the preferred embodiment antenna element assemblies 110. The aforementioned grooves or slots are disposed in halos 130 in a predetermined pattern so as to hold antenna element assemblies 110 from lateral movement and/or to establish/maintain proper spacing therebetween. For example, according to a preferred embodiment slots in halos 130 are provided with a radial alignment angle $\alpha$, e.g., 7.5°, to thereby dispose each antenna element assembly 110 with a wave front view a off of a next adjacent antenna element assembly 110. Moreover, preferred embodiment slots in halos 130 are provided such that antenna element columns of an interleaved sub-array formed from antenna element assemblies 110 are spaced a predetermined distance $d_2$, e.g., approximately ½ wavelength ($\lambda$), apart. Preferred embodiment slots in halos 130 are provided such that antenna element columns of different interleaved sub-arrays formed from antenna element assemblies 110 are spaced a predetermined distance $d_1$, e.g., ¼ wavelength ($\lambda$) where the wavelength is the wavelength of the highest frequency, less than $d_2$ apart.

According to a preferred embodiment of the present invention, separate feed networks are provided with respect to one or more of the aforementioned sub-arrays to thereby facilitate independent beam forming with respect thereto. Embodiments of the present invention provide a structure that allows for the beam forming network associated with one or more antenna element sub-array to be reconfigured independently of the beam forming network associated with another one or more antenna element sub-array. Accordingly, ones of the multiple discrete antenna beams provided by the antenna array sub-arrays may be utilized by a plurality of communication providers operating in the same or different communication bands, such as an AMPS band and a PCS band. Additionally or alternatively, ones of the multiple discrete antenna beams provided by the antenna array sub-arrays may be utilized by a same communication provider, such as to provide a pilot channel using a first sub-array and a traffic channel using a second sub-array.

Preferred embodiments of the present invention utilize beam forming personality modules associated with one or more sub-arrays to facilitate independent configuration/reconfiguration of beam forming networks of the various sub-arrays. Such personality modules are preferably passive beam forming networks provided in removable modules for interfacing with antenna elements of a particular sub-array. Accordingly, as cell topology, morphology, and/or usage patterns change, thus suggesting that a particular beam forming pattern that is used for an individual communication provider should be changed, beam forming personality modules of the present invention may be changed to implement desired beam forming pattern changes.

Figure 4A:
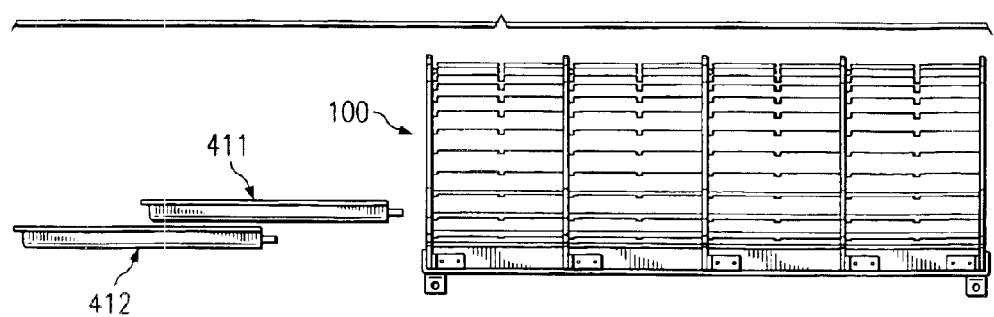
FIGS. 4A and 4B show introduction of an embodiment of personality modules into the antenna array of FIGS. 1A and 1B.
Figure 4B:
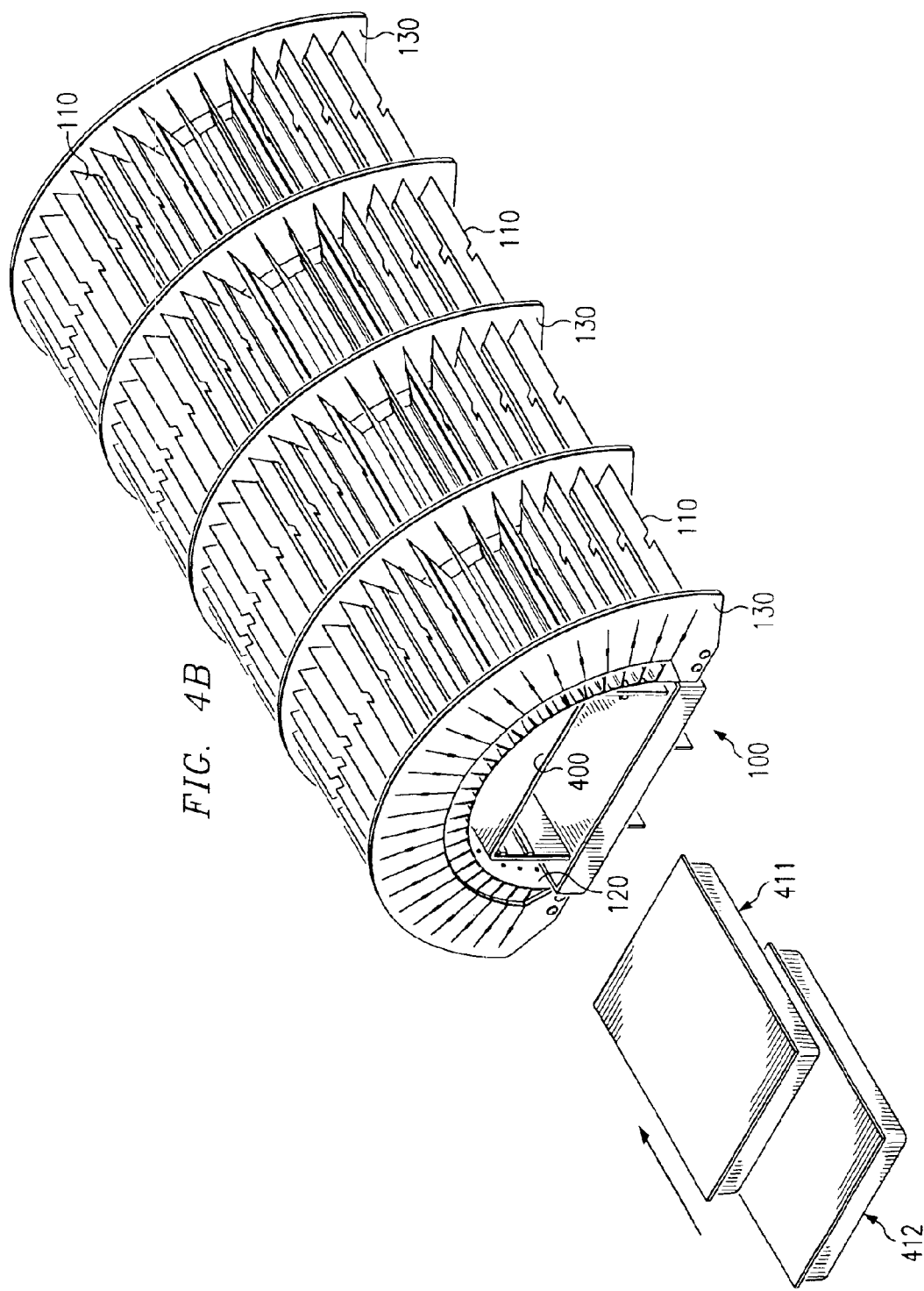

Directing attention to FIGS. 4A and 4B, personality modules of a preferred embodiment are shown as personality modules 411 and 412. Personality modules 411 and 412 of the illustrated embodiment are adapted to be incarcerated by cage 400 disposed behind shell 120 of antenna array 110. According to the preferred embodiment, either or both of personality modules 411 and 412 may be engaged/disengaged in cage 400, and thereby placed in communication/taken out of communication with antenna array 100, as desired to facilitate deployment of a desired personality module with respect to a sub-array or sub-arrays of antenna array 100.

It should be appreciated that, although two personality modules are shown in FIGS. 4A and 4B, any number of such personality modules may be implemented according to the present invention. Moreover, although shell 120 of the illustrated embodiment provides a structure encompassing cage 440 and personality modules 411 and 412 (when engaged), there is no limitation that such a configuration be implemented according to the present invention. However, it should be appreciated that the illustrated configuration provides for a relatively compact implementation.

Figure 5:
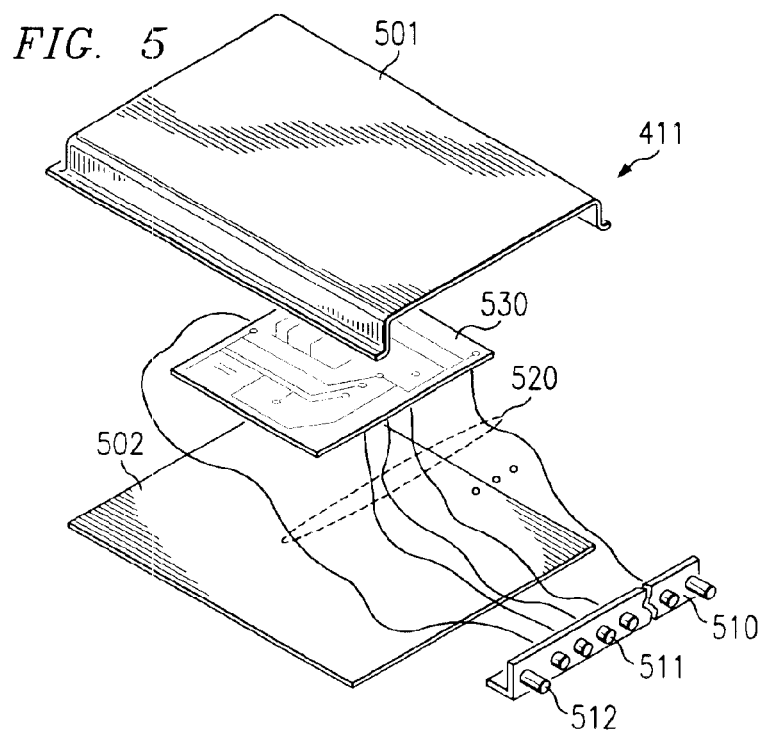
FIG. 5 shows detail with respect to an embodiment of a personality modules of FIGS. 4A and 4B.

Referring now to FIG. 5, detail with respect to a preferred embodiment personality module is shown. Specifically, personality module 411 is shown to comprise cover 501 and base 502, such as may provide structural support, electrical and/or magnetic shielding, weather protection, a rugged housing for transportation, and/or the like. According to a preferred embodiment cover 501 and base 502 are comprised of a sheet metal having a handle or hand grip (not shown) disposed thereon for grasping by an individual, such as a installation technician. Connector panel 510 of the illustrated embodiment preferably fastens to either or both of cover 501 and base 502 to seal an interior cavity. Connector panel 510 preferably includes a plurality of connectors 511, such as may provide friction fit coaxial connection interfaces for coupling personality module 411 to antenna element assemblies 110 of an associated sub-array and one or more signal feed cables, such as a BTS transmission cable leading down-mast. Guide pins 512 are preferably provided to facilitate proper slideable engagement of connectors 511 with corresponding connectors (not shown), such as may be disposed in cage 400.

Additionally, personality module 411 of the illustrated embodiment comprises circuit card 530 coupled to connectors 511 via transmission cables 520 and incarcerated within the interior cavity formed by cover 501, base 502 and connector panel 510. Circuit card 530 of the preferred embodiment provides a passive beam forming network, such as may be made as shown and described in the above referenced patent application entitled "Generating Arbitrary Passive Beam Forming Networks." Preferably, circuit card 530 provides signal weighting and phase control with respect to signals associated with antenna elements of a particular sub-array to facilitate desired beam forming, as is well known in the art. Accordingly, a plurality of connectors 511 and cables 520 may couple signals of antenna element columns to branches of a feed network of circuit card 530. Preferably, the cable lengths of each such cable of the aforementioned plurality of cables are carefully selected so as not to introduce errors in the aforementioned signal weighting and/or phase control, such as through use of cables having the same length to couple branches of circuit card 530 with antenna element columns of antenna array 100.

Figure 6:
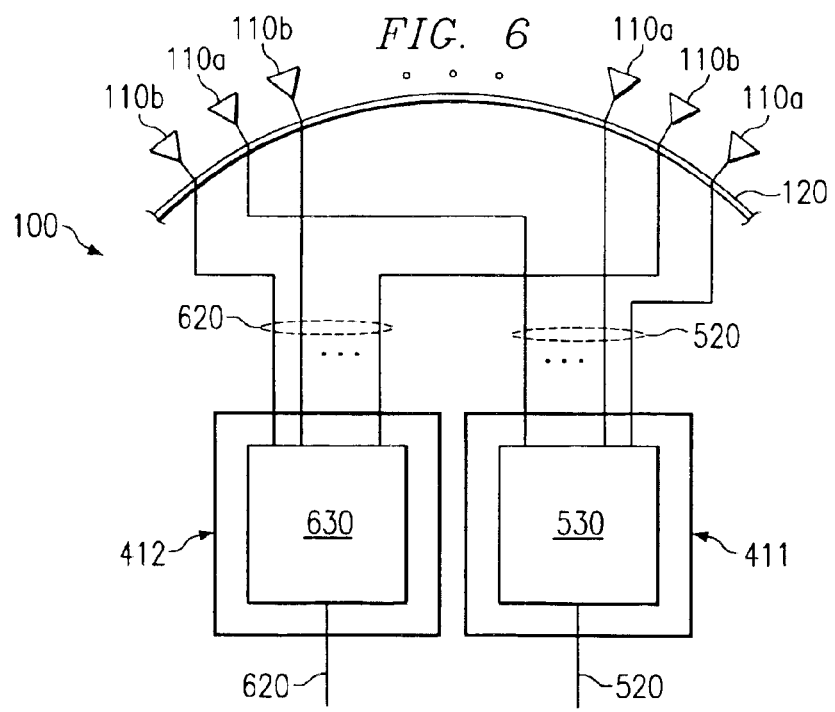
FIG. 6 shows a block diagram of an embodiment of the antenna array of FIGS. 1A and 1B having an embodiment of the personality modules of FIGS. 4A and 4B coupled thereto.

Directing attention to FIG. 6, a block diagram of personality modules 411 and 412 coupled to the antenna element assemblies of antenna array 100 is shown. According to the illustrated embodiment, beam forming circuit card 530 of personality module 411 is coupled to antenna elements 110$a$ of a first sub-array via a plurality of transmission cables of cables 520. Similarly, beam forming circuit card 630 of personality module 412 is coupled to antenna elements 110$b$ of a second sub-array via a plurality of transmission cables of cables 620. Although the illustrated embodiment shows sub-arrays associated with the personality modules being interleaved with respect to columns of antenna elements, embodiments of the present invention provide for interleaving of antenna elements within columns, as discussed in detail below with respect to FIGS. 7A and 7B. In such an embodiment, the different personality modules of FIG. 6 may be coupled to the same ones of antenna element assemblies 110, although being coupled to different ones of the antenna elements disposed thereon. Additionally or alternatively, antenna elements of the various sub-arrays may be disposed in columns in a stacked configuration, as discussed in detail below with respect to FIG. 7C.

It should be appreciated that, although shown as containing a single beam forming circuit card, embodiments of the present invention may provide multiple discrete beam forming circuits within a single personality module. For example, where a communication provider utilizes a first sub-array for providing a pilot channel and a second sub-array for providing a related traffic channel, it may be desirable to configure/reconfigure the associated beam forming networks simultaneously. Accordingly, a personality module of the present invention may comprise multiple beam forming networks to facilitate simultaneous configuration/reconfiguration of beam forming with respect to associated sub-arrays.

It has been determined that the use of passive beam forming networks of the preferred embodiment provide a sufficient level of beam forming control in many situations as cell topology and/or morphology are often relatively slow to change. Accordingly, in many situations a dynamic beam forming control system may operate to select beam forming patterns which remain substantially unchanged for a long period of time, perhaps requiring change every few months, seasonally, or even annually. Rather than utilizing a complex and typically expensive dynamic beam forming control system which is under utilized much of the time, preferred embodiments of the present invention implement passive beam forming circuit cards disposed in easily replaceable modules to facilitate configuration/reconfiguration of antenna beam forming as needed. For example, measurements may be taken and/or operating parameters may be monitored continuously or periodically to determine an appropriate time for implementing beam forming change, i.e., changing of a personality module. Systems and methods for determining such beam forming characteristics for implementing passive beam forming circuitry are shown and described in the above referenced patent applications entitled "Passive Shapable Sectorization for Cellular Networks" and "Passive Shapable Sectorization Antenna Gain Determination."

Figure 7B:
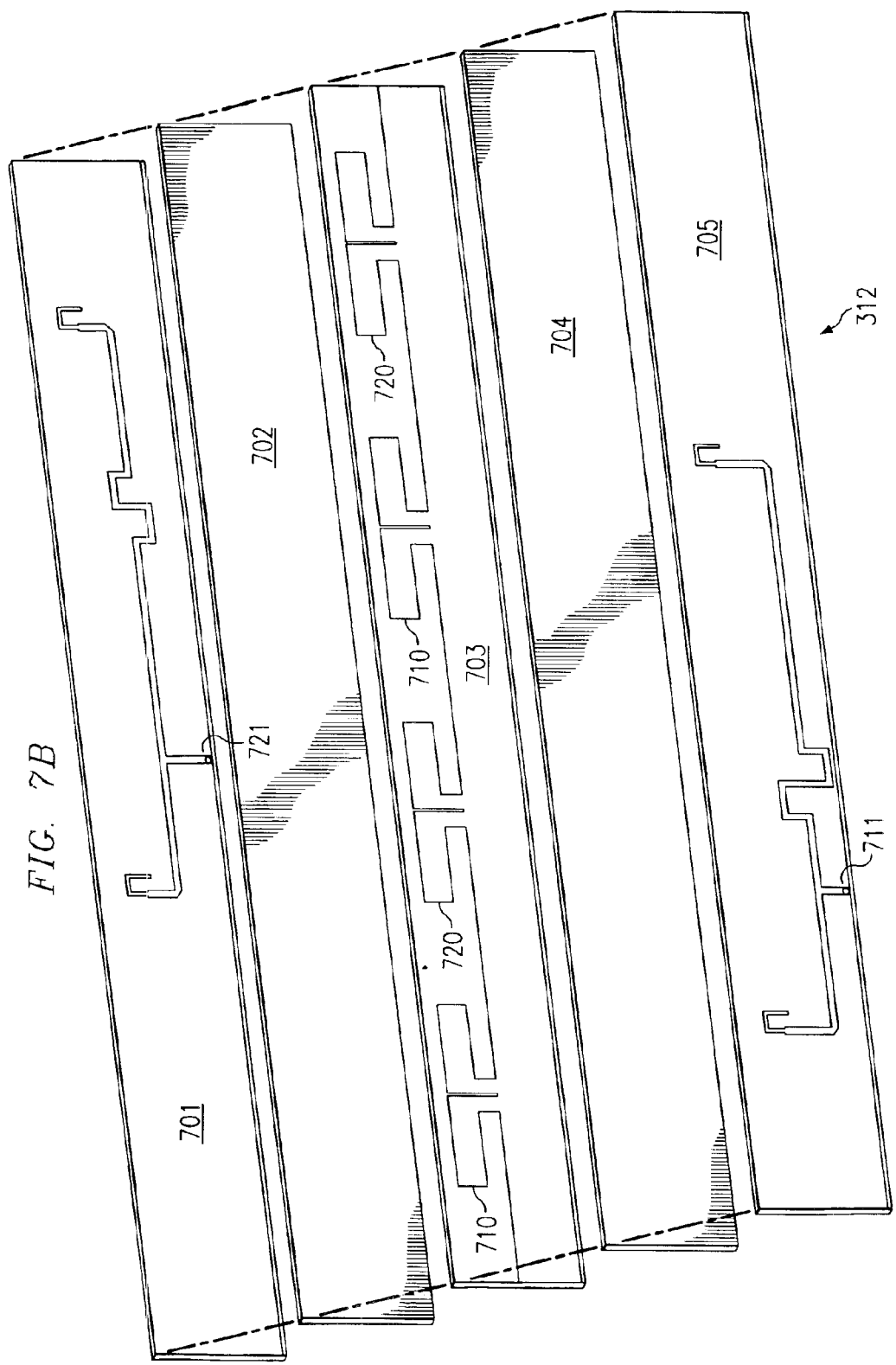

Directing attention to FIGS. 7A and 7B, an embodiment of a portion of antenna element assembly 110 having antenna elements of multiple sub-arrays interleaved thereon is shown. Specifically, antenna element card 312 is shown to comprise antenna elements 710 of a first sub-array interleaved with antenna elements 720 of a second sub-array. For example, antenna elements 710, disposed in even row numbers, may be coupled to a signal of a first service via feed node 711 while antenna elements 720, disposed in odd row numbers, are coupled to a signal of a second service via feed node 721. It should be appreciated that, although shown with antenna elements of two sub-arrays, two or more services can share a common column radiator structure, while keeping the over size of the antenna structure small, using the techniques described herein.

Directing attention to FIG. 7C, an embodiment of a portion of antenna element assembly 110 having antenna elements of multiple sub-arrays disposed in a stacked configuration is shown. Specifically, antenna element card 312 is shown to comprise antenna elements 710 of a first sub-array disposed adjacent to one another and antenna elements 720 of a second sub-array disposed adjacent to one another. Antenna elements 710 may be coupled to a signal of a first service via feed node 711 while antenna elements 720 are coupled to a signal of a second service via feed node 721. It should be appreciated that, although shown with antenna elements of two sub-arrays, two or more services can share a common column radiator structure.

The densely packed antenna elements are adapted to co-exist according to a preferred embodiment, while maintaining inter-service isolation, by making the antenna elements electrically shorter than the traditional ½ wavelength ($\lambda$) element length. The resulting capacitive reactance is compensated for in the attendant feed system according to the preferred embodiment. Thus, the shortened dipoles may be grouped in rows closer together. A preferred embodiment of the present invention provides antenna elements which are approximately $0.4\lambda$ in length, where $\lambda$ is the wavelength of the carrier corresponding to the particular sub-array of an antenna element so sized.

According to a preferred embodiment, a multi-layer board configuration (e.g., three cladding layers and two substrate layers) is utilized in facilitating two or more independent signals co-existing on a single column radiator structure. With reference to FIG. 7B, a preferred embodiment wherein a printed circuit board is etched to make dipole antenna elements out of a center cladding (layer 703) with independent feed systems (layers 701 and 705) existing on the opposite outer cladding layers and dielectric substrates (layers 702 and 704) disposed between. It should be appreciated that the aforementioned substrates may be substituted by air, thus making up an air-line feed system, if desired.

According to the illustrated embodiment, the two feed systems are isolated from each other in part by virtue of a portion of the central cladding (layer 703) acting as a ground plane, while a different portion of the central cladding makes up the dipoles. The dipoles of the illustrated embodiment make up the rows of the column radiator structure, with odd numbered dipoles being feed by one of the outer cladding feed systems and even numbered dipoles being feed by the opposing feed system on the other outer cladding. This technique allows at least two independent users to co-exist on a common column structure.

Figure 8C:
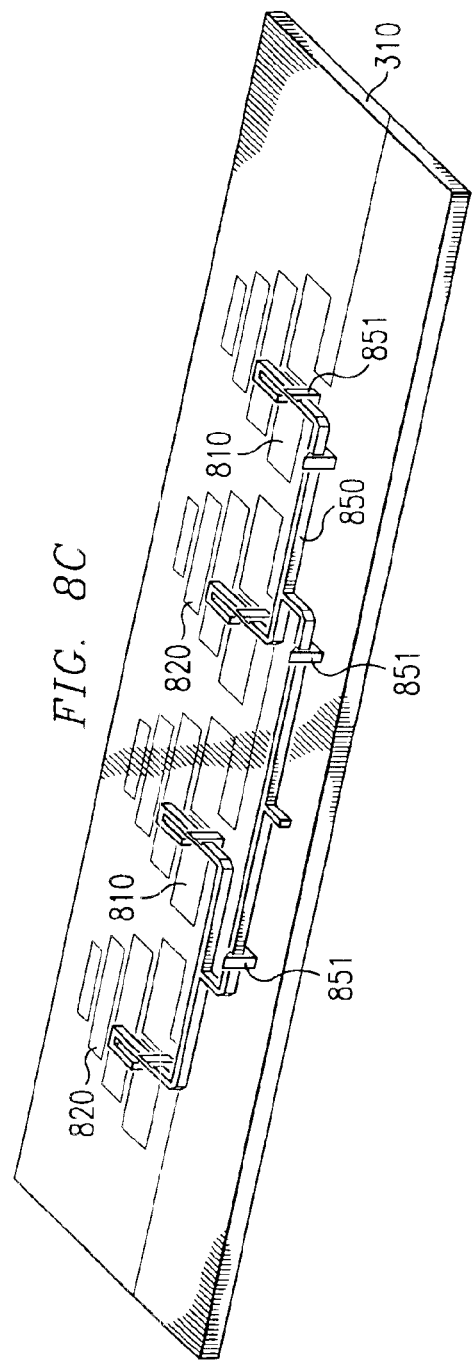

Directing attention to FIGS. 8A–8E, various embodiments of portions of antenna element assemblies 110 are shown. FIG. 8A illustrates an embodiment wherein director card 311 comprises a first material, such as a low grade, low cost dielectric substrate, having passive directive elements 820 disposed (preferably etched) upon the underside thereof. Antenna element card 312 of FIG. 8A comprises a second material, such as a high grade, low-loss dielectric substrate, having antenna elements 810 disposed (preferably etched) upon the underside thereof. Antenna element card 312 further includes feed paths 850, such as may comprise microstrip feed lines, disposed (preferably etched) upon the upper side thereof.

It should be appreciated that director card 311 may utilize a lower grade, perhaps more lossy, dielectric substrate than antenna element card 312 (it being appreciated that traditional microstrip feed systems benefit from highly homogeneous, highly isotropic, low-loss dielectric substrates). In the embodiment of FIG. 8A the substrate of director card 311 is not being relied upon to provide separation of a feed structure and active antenna elements, but rather is relied upon to provide structural support for the passive directive elements. Director card 311 and antenna element card 312 may be held in a desired relationship, such as that shown in FIGS. 3A and 3B, using any number of techniques, including a "H" clip disposed therebetween, application of adhesive material, use of mechanical fasteners, and the like.

FIG. 8B illustrates an embodiment wherein card assembly 310 is a substantially unitary structure. Accordingly, a single substrate, such as a high grade, low-loss dielectric material, having antenna elements 810 and passive directive elements 820 disposed (preferably etched) upon the underside thereof. Card assembly 310 further includes feed paths 850 disposed (preferably etched) upon the upper side thereof.

FIG. 8C illustrates an embodiment wherein card assembly 310 is again a substantially unitary structure. Accordingly, a single substrate, such as a low grade, low-cost dielectric material, having antenna elements 810 and passive directive elements 820 disposed (preferably etched) upon the upper side thereof. Card assembly 310 further includes feed paths 850 supported above the upper side thereof, such as through use of non-conductive (e.g., plastic) standoffs 850.

It should be appreciated that the embodiment of FIG. 8C may utilize a lower grade, perhaps more lossy, dielectric substrate than an embodiment such as that of FIG. 8B. In the embodiment of FIG. 8C the substrate is not being relied upon to provide separation of the feed structure and antenna elements, but rather is relied upon to provide structural support.

Figure 8D:
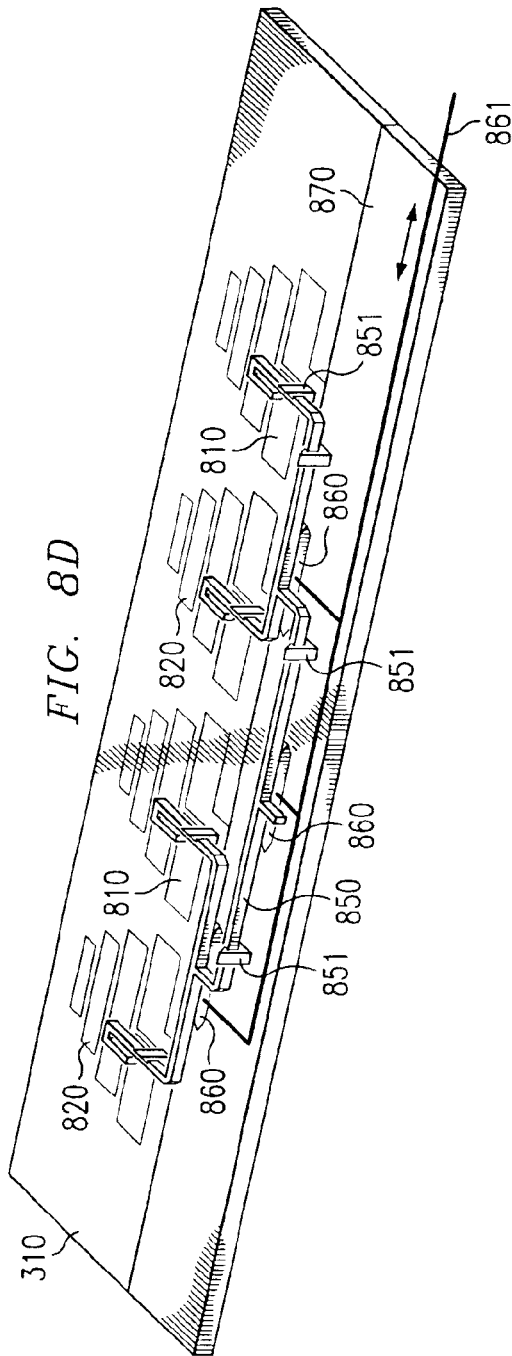

FIG. 8D illustrates an embodiment wherein control of electrical down-tilt is provided. Specifically, like FIG. 8C described above, the embodiment of FIG. 8D comprises a single substrate having antenna elements 810 and passive directive elements 820 disposed upon an upper surface thereof and feed paths 850 supported above the upper surface using standoffs 850. However, in the embodiment of FIG. 8D, dielectric phase shifting blocks 860 are disposed between ground plane 870 and portions of feed paths 850. Preferably, dielectric phase shifting blocks 860 are disposed at one or more branches in feed paths 850 (e.g., power division/combining points) to effect a phase differential with respect to the branches and facilitate scanning of an antenna beam formed by antenna elements 810. Specifically, the phase delay can be controlled such that a radiating beam can be scanned in physical space. For example, dielectric phase shifting blocks 860 may be moved parallel to the feed path branches, such as through the use of gang 861, to effect a phase differential change between ones of the antenna elements 810.

It should be appreciated that a variety of dielectric phase shifting block configurations may be utilized according to the present invention. For example, FIG. 8E shows an embodiment wherein triangular phase shifting blocks 870, such as may be moved perpendicularly to the feed path branches using gang 871, are used to effect a phase differential change between ones of the antenna elements 810.

Preferably, dielectric phase shifting blocks utilized according to the present invention are adapted to minimize signal loss and/or reflection associated with the transition from air to dielectric medium. FIGS. 9A–9C show detailed side views of three possible dielectric block shapes. Specifically, the dielectric blocks illustrated in each of FIGS. 9A–9C include faces which are tapered to improve the transition of RF energy from air to dielectric medium.

It should be appreciated that various methods of controlling dielectric block phase shifter movement may be utilized according to the present invention. For example, the aforementioned gangs may be manually adjusted as desired, such as at the time of initial deployment and/or periodically throughout operation of the antenna array. Additionally or alternatively, automated means, such as a stepper motor or servo operable under control of a (perhaps closed loop) control system, may provide desired adjustment of the dielectric blocks.

Although the use of dielectric blocks is described above for providing adjustable down-tilt according to an embodiment of the present invention, it should be appreciated that down-tilt and/or other antenna beam scanning control may be provided using a variety of techniques according to the present invention. For example, switchable feed path portions may be provided to allow introduction of selectable delays between ones of the antenna elements.

It should be appreciated that, although preferred embodiments have been described herein with reference to Yagi antenna elements, the present invention is not limited to the use of any particular antenna element design. Moreover, the present invention is not limited to the number of antenna elements, number of antenna element assemblies, or the number of sub-arrays shown and described with respect to the exemplary embodiments herein.

It should be appreciated that the concepts of the present invention facilitate maximizing the number of communication providers and/or communication services which may be served by one antenna placement. Such maximization is of value to those who own towers, those who are in markets where new construction of towers is restricted, or those where the towers are already loaded with resident antennas.

Additionally, the concepts of the present invention facilitate the use of a simplified antenna array configuration in that passive beam forming is utilized. Notwithstanding the preferred embodiment simplified passive beam forming configuration, embodiments of the present invention provide complex beam forming attributes to provide high quality communication throughout a service area. Moreover, the passive beam forming configuration of the preferred embodiment is readily configurable/reconfigurable to accommodate cell topology and morphology changes over time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An antenna array comprising:
 a plurality of high directivity antenna elements comprising a first sub-array and a second sub-array, wherein antenna elements of said first sub-array are interleaved with antenna elements of said second sub-array in said antenna array and said interleaved sub-arrays comprise separate beam-forming networks.

2. The antenna array of claim 1, wherein said high directivity antenna elements are disposed in a plurality of antenna element columns.

3. The antenna array of claim 2, wherein ones of said antenna element columns comprise antenna elements of said first sub-array and other ones of said antenna element columns comprise antenna elements of said second sub-array.

4. The antenna array of claim 3, wherein said antenna element columns of said first sub-array are disposed approximately ½ wavelength of a carrier associated with said first sub-array apart from a next antenna element column of said first sub-array and said antenna element columns of said second sub-array are disposed approximately ½ wavelength of said carrier associated with said first sub-array apart from a next antenna element column of said second sub-array.

5. The antenna array of claim 2, wherein said antenna element columns comprise two or more antenna elements of said plurality of high directivity antenna elements.

6. The antenna array of claim 2, wherein said antenna element columns are disposed in a non-planar configuration.

7. The antenna array of claim 6, wherein said non-planar configuration comprises a portion of a cylindrical contour.

8. The antenna array of claim 6, wherein said antenna element columns are disposed having a predetermined angle α with respect to each next adjacent antenna element column.

9. The antenna array of claim 8, wherein said predetermined angle α is approximately 7.5°.

10. The antenna array of claim 2, wherein said antenna element columns comprise 24 antenna element columns.

11. The antenna array of claim 10, wherein said first sub-array comprises 12 antenna element columns and said second sub-array comprises 12 antenna element columns.

12. The antenna array of claim 2, wherein said antenna element columns comprise antenna element assemblies.

13. The antenna array of claim 12, wherein said antenna element assemblies comprise an antenna element card.

14. The antenna array of claim 13, wherein said antenna element assemblies further comprise a director card.

15. The antenna array of claim 14, wherein said antenna element card and said director card are comprised of a different substrate layer.

16. The antenna array of claim 14, wherein said antenna element card and said director card are comprised of a same substrate layer.

17. The antenna array of claim 1, wherein said high directivity antenna elements comprise Yagi antenna elements.

18. The antenna array of claim 1, further comprising:
a first removable personality module coupled to said antenna array, wherein said first personality module comprises a first passive beam forming network providing complex beam forming weighting with respect to signals associated with a plurality of antenna elements of said antenna array.

19. The antenna array of claim 18, further comprising:
a second removable personality module coupled to said antenna array, wherein said second personality module comprises a second passive beam forming network providing complex beam forming weighting with respect to signals associated with a plurality of antenna elements of said antenna array.

20. The antenna array of claim 19, wherein said first removable personality module is coupled to antenna elements of said first sub-array and said second removable personality module is coupled to antenna elements of said second sub-array.

21. The antenna array of claim 19, wherein said first passive beam forming network and said second passive beam forming network provide different beam forming characteristics.

22. The antenna array of claim 1, wherein said first sub-array is associated with a signal of a first communication service and said second sub-array is associated with a signal of a second communication service.

23. The antenna array of claim 22, wherein said first and second communication services operate in different bands.

24. The antenna array of claim 22, wherein said first and second communication services operate in a same band.

25. An antenna array comprising:
a plurality of high directivity antenna elements comprising a first sub-array and a second sub-array, wherein antenna elements of said first sub-array are interleaved with antenna elements of said second sub-array in said antenna array, wherein said antenna element columns comprise two or more antenna elements of said plurality of high directivity antenna elements, and wherein an antenna element column of said antenna element columns comprises antenna elements of said first sub-array and antenna elements of said second sub-array.

26. The antenna array of claim 25, wherein said antenna elements of said first sub-array and said antenna elements of said second sub-array are interleaved in said antenna element column.

27. The antenna array of claim 25, wherein a plurality of antenna elements of said first sub-array are disposed adjacent to one another in said antenna element column.

28. The antenna array of claim 25, wherein said antenna elements of said first sub-array comprise an aerial less than ½ wavelength of a carrier associated with said first sub-array and said antenna elements of said second sub-array comprise an aerial less than ½ wavelength of a carrier associated with said second sub-array.

29. An antenna array comprising:
a plurality of high directivity antenna elements comprising a first sub-array and a second sub-array, wherein antenna elements of said first sub-array are interleaved with antenna elements of said second sub-array in said antenna array, wherein said high directivity antenna elements provide spatial domain radiation dispersion in the azimuth of less than 100°.

30. An antenna array comprising:
a plurality of high directivity antenna elements comprising a first sub-array and a second sub-array, wherein antenna elements of said first sub-array are interleaved with antenna elements of said second sub-array in said antenna array, wherein said high directivity antenna elements are disposed in a plurality of antenna element columns, wherein said antenna element columns comprise antenna element assemblies, wherein said antenna element assemblies comprise an antenna element card, wherein said antenna element card comprises antenna feed lines and a plurality of antenna elements provided structural support by a planar surface.

31. The antenna array of claim 30, wherein said antenna element card comprises 3 cladding layers, a first layer of which provides said antenna elements, a second layer of which provides a portion of said feed lines associated with antenna elements of said first sub-array, and a third layer of which provides a portion of said feed lines associated with antenna elements of said second sub-array.

32. The antenna array of claim 30, further comprising:
dielectric phase adjusters associated with said feed lines, said dielectric phase adjusters adjustable to provided controlled scanning of an antenna beam formed using said antenna array.

33. A system comprising
an antenna array having a plurality of antenna elements, ones of which are associated with a first sub-array and others of which are associated with a second sub-array;
a first removable personality module coupled to said antenna elements associated with said first sub-array, wherein said first personality module provides beam forming characteristics with respect to said first sub-array unique to particular communication attributes of a service area in which it is deployed; and
a second removable personality module coupled to said antenna elements associated with said second sub-array, wherein said second personality module provides beam forming characteristics with respect to said second sub-array unique to particular communication attributes of a service area in which it is deployed.

34. The system of claim 33, wherein said antenna elements of said first sub-array are disposed in alternate ones of antenna element columns with antenna elements of said second sub-array disposed in other alternate ones of antenna element columns.

35. The system of claim 33, wherein said antenna elements of said first sub-array are disposed in alternate ones of antenna element rows with antenna elements of said second sub-array disposed in other alternate ones of antenna element rows.

36. The system of claim 33, wherein a plurality of antenna elements of said first sub-array are disposed adjacent to one another in an antenna element column.

37. The system of claim 33, wherein said antenna array comprises a curvilinear array configuration.

38. The system of claim 33, wherein said antenna elements comprise high directivity antenna elements.

39. The system of claim 33, said first removable personality module provides a substantially different far field radiation pattern than does said second removable personality module.

40. The system of claim 33, wherein said first and second removable personality modules are adapted for plug-in field replacement.

41. A method comprising:

deploying an antenna array having at least a first plurality of antenna elements;

determining first beam forming characteristics for said first plurality of antenna elements using said deployed antenna array;

configuring a first passive feed network of a first personality module to provide said first beam forming characteristics; and installing said first personality module in said deployed antenna array to thereby provide a desired first antenna beam.

42. The method of claim 41, wherein said antenna array has a second plurality of antenna elements, said method further comprising:

determining second beam forming characteristics for said second plurality of antenna elements using said deployed antenna array;

configuring a second passive feed network of a second personality module to provide said second beam forming characteristics; and installing said second personality module in said deployed antenna array to thereby provide a desired second antenna beam, wherein said first antenna beam and said second antenna beam provide different antenna beam contours.

43. The method of claim 41, further comprising:

redetermining said first beam forming characteristics for said first plurality of antenna elements using said deployed antenna array;

configuring a third passive feed network of a third personality module to provide said redetermined first beam forming characteristics;

removing said first personality module from said deployed antenna array; and installing said third personality module in said deployed antenna array in place of said first personality module.

44. The method of claim 41, wherein said antenna elements of said first plurality of antenna elements comprise high directivity antenna elements.

* * * * *